Patented Nov. 1, 1938

2,135,122

UNITED STATES PATENT OFFICE 2,135,122

VINYLIDENE CHLORIDE REACTION PRODUCT

Gerald H. Coleman, Garnett V. Moore, and George B. Stratton, Midland, Mich., assignors to The Dow Chemical Company, Midland, Mich., a corporation of Michigan No Drawing. Application May 19, 1937, Serial No. 143,530

4 Claims. (Cl. 260—2)

This invention relates to a process for the production of resinous compounds by the interaction of vinylidene chloride and aromatic hydrocarbons or their halogen derivatives.

High molecular weight resinous materials have heretofore been produced by the polymerization of vinylidene chloride alone, or together with other polymerizable materials such as styrene, divinyl ether, vinyl esters, and the esters of acrylic acid.

We have now found that an entirely different type of resinous product can be produced by reacting vinylidene chloride with an aromatic hydrocarbon, or with a halogen substituted aromatic hydrocarbon, in the presence of a Friedel-Crafts type catalyst, e. g. aluminum chloride, ferric chloride, and the like. This type of reaction results in the formation of a variety of materials, some of which appear to be diaryl ethylene compounds, while others, from their molecular weight, resemble more closely polymers of such compounds.

In carrying out the preparation of the new resinous products, we have employed anhydrous aluminum chloride as the catalyst in quantities varying from 0.05 to about 0.4 mole per mole of vinylidene chloride, and have ordinarily conducted the reaction in the presence of from 4 to 8 moles of an aromatic hydrocarbon or halogen derivative thereof per mole of vinylidene chloride. The temperature employed varies somewhat, depending to a great extent upon the reactivity of the aromatic compound with which the vinylidene chloride is reacted. We have used temperatures ranging from about 20° C. to about 120° C., the temperature being preferred at which rapid evolution of hydrogen chloride from the reaction mixture occurs.

Among the compounds which we have reacted with vinylidene chloride in this manner are benzene, monochlorobenzene, orthodichloro-benzene, paradichloro-benzene, trichloro-benzene, ethyl monochloro-benzene, tertiary-butyl benzene, diphenyl, and naphthalene. The reaction appears to be general for aromatic hydrocarbons and their halogen derivatives which contain at least one replaceable hydrogen atom in the aromatic nucleus.

The following examples illustrate the practice of our invention:

Example 1

Reaction of vinylidene chloride and benzene. 48.5 grams (0.5 mole) of vinylidene chloride was added in the course of one-half hour to a mixture of 4 moles of benzene and 0.2 mole of aluminum chloride at a temperature of 79° C. The temperature was held at 79° to 80° C. for an additional half-hour. During the course of the reaction, 0.75 mole of hydrogen chloride was evolved from the reactor. The reaction mixture was washed with water to decompose any remaining aluminum chloride complex, and was thereafter dried and distilled. After recovering unreacted benzene, the following products were obtained: 7 grams of a crystalline material having a melting point of about 92° C., and boiling in the range from 160° to about 175° C. at 2 millimeters absolute pressure; 32.5 grams of an oily material boiling in the range from 170° to 173° C. at 2 millimeters; and 26.5 grams of a brown, transparent, brittle product, soluble in benzene and in ethylene chloride, and having a softening point of about 92° to 93° C. The crystalline material and the oily product appear from molecular weight determination and from carbon and hydrogen analyses to be the two isomeric triphenyl ethanes. The brittle residue appears to be a dimeric 1.1 diphenyl ethylene.

A number of further experimental runs in which vinylidene chloride and benzene were reacted produced additional amounts of the two principal products described above, namely, the oily material boiling between about 170° and 173° C. at 2 millimeters, and a somewhat resinous, brittle product having a molecular weight of approximately 360 (average of several determinations). The resinous product was subjected to electrical tests and was found to have a breakdown potential of 17,000 volts when the electrodes were spaced apart a distance of $\frac{1}{10}$ inch; a dielectric constant of 2.85 at 1,000 cycles; and a resistivity of 10,000 megohms over an electrode area of 17.3 square centimeters with the electrodes spaced apart 1.12 millimeters.

Example 2

When vinylidene chloride and monochlorobenzene were reacted in a manner similar to that described above, there was obtained as a principal reaction product a brown, brittle resin which was soluble in benzene, ethylene dichloride, and other common solvents. The softening point of this resinous product from certain of our runs was between about 107° and 111° C. The molecular weight was determined to be about 495 and the chlorine analysis on various batches was about 28 per cent. This corresponds very closely to the dimeric form of 1.1 di-(monochloro-phenyl)-ethylene, which has a theoretical molecular weight of 498 and a chlorine content of 28.5 per cent.

Example 3

Orthodichloro-benzene was reacted with vinylidene chloride in the presence of 0.1 mole of aluminum chloride per mole of vinylidene chloride at a temperature ranging between 50° and 80° C. When the reaction was complete, the products were recovered in a manner similar to that described in Example 1. There was recovered 3.24 moles of orthodichloro-benzene from the 4.0 moles which had been present at the beginning of the reaction. The balance, or about 0.76 mole, was accounted for in the form of two products. The first was an oily minor product, of which only 6 grams were obtained. The principal product, weighing 103 grams, was a solid, dark-colored resin which was not as brittle as those obtained from benzene and from monochloro-benzene. It had approximately the same solubility characteristics as were exhibited by the resins described in the foregoing examples, and had a decomposition point of about 220° C. Molecular weight determination and chlorine analysis on the resinous product indicate that it has an approximate formula similar to dimeric 1.1 di-(orthodichloro-phenyl)-ethylene.

Example 4

When paradichloro-benzene was reacted in an analogous manner, the resinous product obtained was divisible into two portions based on solubility characteristics. The major portion, which was soluble in ethylene dichloride, has not been identified. This material had a decomposition point of 210° C. and a chlorine analysis of about 48.5 per cent. The insoluble portion of the resinous product had a decomposition point above about 450° C. and a chlorine analysis of about 45.6 per cent. While this latter product has not been positively identified, its analysis corresponds approximately to that of dimeric 1.1 di-(paradichloro-phenyl)-ethylene.

Example 5

A vigorous reaction occurred at from 30° to 35° C. when vinylidene chloride was added to ethyl monochloro-benzene in the presence of aluminum chloride. The products, isolated in a manner similar to that described above, consisted of two principal portions. The first was a liquid boiling in the range from about 175° to 179° at 3 millimeters and having a specific gravity at 20°/4° of about 1.14 to 1.16; a refractive index at 20°, using sodium light, of 1.577 to 1.579; a molecular weight of about 300 and a chlorine analysis of about 23.2 per cent. This compound appears to be monomeric 1.1 di-(ethyl monochloro-phenyl)-ethylene, the true molecular weight of which is 305 and the theoretical chlorine content of which is 23.28 per cent. The other principal product of this reaction was a somewhat tacky, resinous substance having a softening point of 29° C., a molecular weight of approximately 452, and a chlorine content of about 24.3 per cent. This compound appears to be tri-(ethyl monochloro-phenyl)-ethane, whose true molecular weight is 445.5, and whose theoretical chlorine content is 23.96.

Example 6

When diphenyl was reacted at 100° C. with vinylidene chloride in the presence of aluminum chloride, a brownish-red, somewhat brittle resin was obtained, which was soluble in ethylene chloride, and which had a softening point of 128.5° C. The product contained no chlorine and from its molecular weight appeared to be tri-diphenyl ethane.

Example 7

Naphthalene reacted with vinylidene chloride in the presence of aluminum chloride to form a dark brown, hard, quite brittle resin, which was soluble in many common organic solvents. This product has a softening point of about 124° C., and from its molecular weight appeared to be tri-naphthyl ethane.

Trichlorobenzene gave products similar in many respects to those derived from ortho and para-dichloro-benzene. The resinous material was somewhat brittle, but was not as hard as those derived from the lower chloro derivatives. The tertiary-butyl benzene-vinylidene chloride reaction products were not identified, except for one by-product, which is believed to be di-tertiary-butyl benzene.

Similar reactions between vinylidene chloride and other aromatic hydrocarbons and their halogen derivatives, e. g. toluene, xylene, ethyl benzene, cumene, n-butyl benzene, n-hexyl benzene, tertiary-octyl benzene, and the various mono-, di-, and tri-chloro-derivatives of such hydrocarbons, will produce resin-like materials similar to those described herein.

Our new resinous products are useful as dielectric media and as coating and impregnating agents.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The process which comprises reacting vinylidene chloride with between about 4 and about 8 molecular proportions of a compound selected from the group consisting of aromatic hydrocarbons and their chloro-derivatives containing at least one replaceable hydrogen atom, in the presence of between about 0.05 and about 0.40 mole of aluminum chloride per mole of vinylidene chloride, at a temperature between about 20° and 120° C., until the evolution of hydrogen chloride is substantially complete.

2. The process which comprises reacting vinylidene chloride with a chlorinated aromatic hydrocarbon containing at least one replaceable hydrogen atom, in the presence of a Friedel-Crafts catalyst.

3. The resin-like product obtained by reacting vinylidene chloride with between about 4 and about 8 molecular proportions of a compound selected from the group consisting of aromatic hydrocarbons and their chloro- derivatives containing at least one replaceable hydrogen atom, in the presence of between about 0.05 and about 0.40 mole of aluminum chloride per mole of vinylidene chloride, at a temperature between about 20° and 120° C., until the evolution of hydrogen chloride is substantially complete, and thereafter removing unreacted vinylidene chloride, unreacted aromatic compound, and non-resinous products from the reaction mixture.

4. The product prepared by the process of claim 2.

GERALD H. COLEMAN.
GARNETT V. MOORE.
GEORGE B. STRATTON.